Nov. 5, 1940.　　　　　　E. MULLER　　　　　　2,220,378
MICROMETER
Filed April 19, 1939
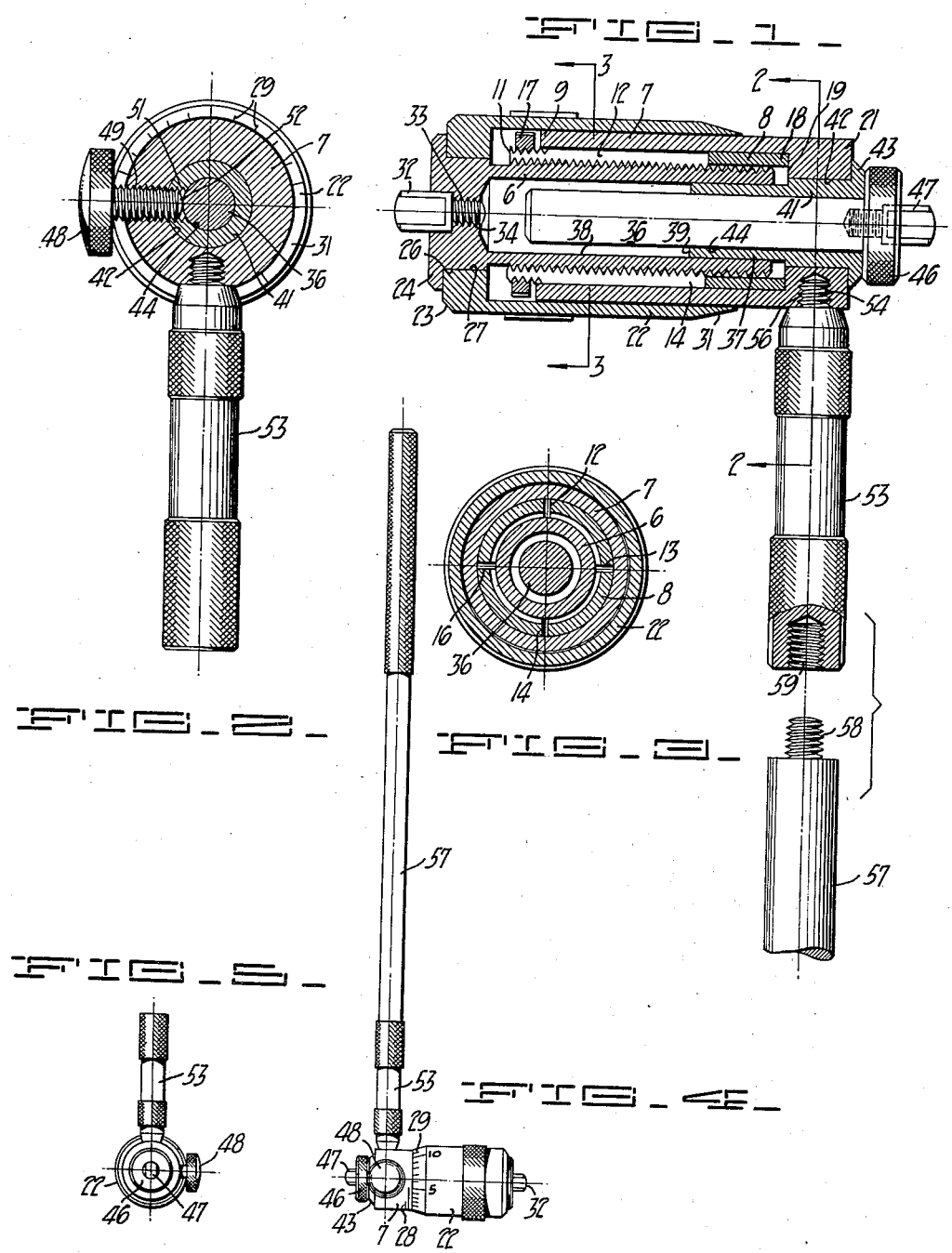
INVENTOR
*Ernest Muller*
BY *Joseph B. Gardner*
ATTORNEY Patented Nov. 5, 1940

2,220,378

UNITED STATES PATENT OFFICE 2,220,378

MICROMETER

Ernest Muller, San Leandro, Calif.

Application April 19, 1939, Serial No. 268,716

4 Claims. (Cl. 33—164)

The invention relates to micrometers and more particularly to that type of instrument commonly denominated as inside micrometer calipers.

A micrometer of the character described is normally composed of a pair of telescopic threadably engaged sections which are longitudinally adjustable relative to each other and which are calibrated for indicating a linear measurement between the opposite measuring points of the instrument. One of these measuring points is customarily constructed in the form of a measuring rod which is slidably engaged in one end of the instrument for various longitudinal settings of the rod, whereby an instrument may be used for measuring distances greater than the normal length of the attached threaded sections. One of the important limitations of such micrometers heretofore has been the relatively large required length of the instrument in order to provide an adequate adjustment between the sections, and also for a proper support of the various parts including the measuring rod aforementioned. For example, in such an instrument having a calibrated measuring variation of one-half inch, the minimum over-all length of the instrument has been not less than two inches. In accordance with the present invention and as a principal object thereof I have provided a micrometer of the character described which is designed and constructed in a manner reducing the over-all length of the instrument in proportion to the adjustment length of the instrument, and at the same time retain all necessary and desirable support for the several parts of the instrument. For example, the present instrument may be constructed with a calibrated measuring variation of one-half inch and yet have a minimum over-all length not exceeding one and one-half inches.

Another object of the invention is to provide a micrometer of the character above which may be more readily handled by the user when inserting the instrument into relatively shallow holes or concavities. As an important feature of this construction, the arrangement of the handle is such relative to the other parts of the instrument that the handle need not be removed when inserting the instrument into a shallow opening. As a further feature I may arrange the handle in sections so that a short or long handle may be readily provided.

The invention possesses other objects and features of advantage, some of which with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is an enlarged longitudinal sectional view of a micrometer constructed in accordance with the present invention.

Figure 2 is a cross-sectional view of the micrometer taken substantially on the plane of line 2—2 of Figure 1.

Figure 3 is a cross-sectional view of the micrometer taken substantially on the plane of line 3—3 of Figure 1.

Figure 4 is a side elevation of the micrometer shown on a reduced scale.

Figure 5 is an end view of the micrometer shown in the same scale as in Figure 4.

The micrometer of the present invention consists briefly of an instrument composed of a plurality of threaded telescopically engaged members adjustable longitudinally of each other to provide a linear measurement between the opposite ends of the members and wherein one of the sections is provided with an interiorly extending bearing adapted to telescope into the adjacent end of the inner of the telescopic members for providing a longitudinal bearing for a measuring rod forming part of the instrument, whereby the support for the measuring rod is telescoped back into the instrument in contrast to being formed as an additive part of the instrument and thus the over-all length of the instrument is substantially reduced. The instrument is further provided with a set-screw for holding the measuring rod in adjusted longitudinal position and in addition, I use with the instrument a short stub handle section which is fixed to the end of the instrument adjacent to the set-screw and at a portion of the periphery of such end spaced approximately ninety degrees from the set-screw, whereby when the instrument is inserted into a shallow opening or the like with the handle uppermost, the set-screw will be removed from the under-side of the instrument and allow the instrument to be fully inserted into the opening. By reason of this construction the operator need not remove the handle, as has been heretofore necessary, upon use of the instrument in shallow openings due to the previous location of the handle at a peripheral side opposite to the set-screw.

With reference more particularly to the accompanying drawing, the micrometer of the present invention includes a pair of telescopically engaged inner and outer members 6 and 7, the latter being provided with a pressed-in sleeve 8 formed with interior threads engaged with exterior threads on the member 6. In the present instance the sleeve 8 is inserted from one end 9 of the member 7 and is of a length leaving the outer end 11 thereof protruding slightly from the end 9. The sleeve is also slit longitudinally as at 12, 13, 14 and 16 (see Figure 3) and the end portion 11 is provided with tapered threads which are engaged with a nut 17 for controlling the tightness of engagement between the threads on the sleeve and those on the spindle 6. The opposite end 18 of the sleeve 8 may be pressed into longitudinally abutting relation with a shoulder 19 formed interiorly of the member 7 adjacent the opposite end 21 thereof.

An outer sleeve or thimble 22 is fixed at one end 23 to one end 24 of the spindle 6, as by pressing a cylindrical portion 26 of the spindle into a cylindrical opening 27 of the thimble, and extends into surrounding relation about the periphery of the member 7. In common with other similar types of micrometers, the outer periphery of the member 7 is provided with a plurality of longitudinally spaced calibrations 28 which cooperate with a plurality of peripheral calibrations 29 on one end 31 of the thimble for indicating the length of adjustment between the members.

A measuring contact point 32, here in the form of a pin, is provided at the end 24 of the spindle and as here shown, the pin is provided with a reduced threaded end 33 which is threaded into a bore 34 provided in the end wall of the spindle.

As is customary in this type of measuring instrument, I use a measuring rod 36 at the opposite end of the instrument for providing a measuring contact point, and this rod is adjustably carried by the instrument for longitudinal extension therefrom to provide an increased over-all length of the instrument where desired. Heretofore it has been the custom to provide a bearing portion for the rod adjacent an end of the instrument corresponding with the end 21 of the member 7 herein, which bearing portion has added to the normal range of the outer telescopic member and hence to the over-all length of the instrument. A certain required minimum length of bearing need be provided the rod in order to support the same, particularly in its outward extended position. This minimum length of support in a small size micrometer is in the order of one-half inch. In accordance with the present construction and as a principal feature thereof I have provided for the telescoping of this rod supporting bearing back into the interior of the instrument, whereby ample support for the rod is afforded without extending the over-all length of the instrument. This is effected as here shown, by the extension of a bearing means 37 interiorly from the end 21 of the outer telescopic member and forming the interior bore 38 in the inner member 6 of sufficient size to receive the interior projecting end 39 of the bearing means. In the present construction the bearing means 37 is in the form of a bushing which is pressed longitudinally into the end 21 of the member 7 so as to provide a pressed fit between a cylindrical portion 41 on the bushing with the interior wall of a bore 42 opening to the end 21 of the member 7. The bushing is preferably provided with an exterior shoulder 43 which abuts the end 21. The measuring rod 36 is of a diameter slidably fitting within the interior bore 44 of the bushing, and the engagement of the bushing and rod is of sufficient length as to provide a substantial support for the rod when moved to an outwardly extended position. The rod as here shown is provided with a circumscribing shoulder or enlargement 46 adjacent its outer end which in the inward position of the rod, abuts the end shoulder 43 on the bushing. A measuring contact point 47 is here provided for the outer end of the rod and is in the form of a pin threaded into the end of the rod. When it is desired to extend the rod, the same is ordinarily removed and a sleeve of measured length inserted on the rod, and the latter then replaced so that the sleeve will lie between the bushing shoulder 43 and the rod shoulder 46. Such a sleeve is customarily used in the art and is therefore not shown, it being understood that the sleeve is of a fixed measured length, so that the distance of extension provided by the sleeve may be added to the indicated measurement of the micrometer.

In accordance with the above construction, applicant is able to reduce the over-all length of the micrometer by the distance of the bearing support for the measuring rod which amounts to approximately one-half inch. In a standard size of micrometer to which the present invention relates, the required length of the instrument in order to provide a proper support for the various parts, is approximately one inch and thus when to this length is added a desired measuring variation of one-half inch, applicant is able to provide a micrometer having an over-all minimum length of one and one-half inches, whereas formerly no micrometer of the character described has been made under two inches. Thus the present instrument, while retaining all necessary safe-guards for ensuring accuracy of the instrument, is substantially reduced in length and may be used in smaller openings than micrometers heretofore available.

A set-screw 48 is threaded through aligned openings 49 and 51 in the end 21 of the member 7 and in the cylindrical part 41 of the bushing, for direct bearing of the interior end 52 of the set-screw against the measuring rod 36, so as to hold the latter in adjusted longitudinal position. A handle 53 is similarly secured to the end 21 of the outer telescopic member and as here shown, the attached end 54 of the handle is reduced and threaded into a threaded opening 56 in the member 7. As an important feature of the present construction I arrange the handle as may be best seen in Figures 4 and 5 at a peripheral portion of the instrument spaced approximately ninety degrees from the set-screw 48. By reason of this arrangement, the instrument may be carried by the handle 53 and inserted into a relatively shallow opening in a vertical position of the handle, as shown in Figure 5, and in such position the set-screw 48 is removed from the under-side of the instrument and thereby allows the complete insertion of the instrument into the opening. In micrometers of the present type heretofore made, it has been customary to place the set-screw at an opposite side of the periphery from the handle and then when the instrument was to be inserted into a relatively shallow opening, the handle was removed so that the peripheral portion of the instrument at the handle could be inserted into the opening, for otherwise insertion of the instrument by means of the handle would cause the set-screw to engage the bottom of the shallow opening and prevent the insertion of the instrument into the opening. Accordingly, by reason of the present construction, it is not essential to remove the handle and the same may be permanently left attached to the instrument. This is of considerable importance in view of the fact that the engaged threaded portion of the handle end and the body of the instrument are of necessity relatively small, and consequently a frequent attachment and removal of the handle will usually result in an untimely stripping of the attaching threads. This has been particularly encountered in instruments heretofore where handles of various lengths have been frequently attached to and detached from the instrument. In accordance with the present construction, however, wherein the attached end 54 of the handle 53 may be left permanently affixed to the body, there is no danger of the connection between the handle and the body becoming inoperative. To increase the length of the handle I prefer to add a handle section 57 to the section 53 and to this end the section 57 is provided with a threaded end portion 58 which may be engaged in a threaded socket 59 provided in the outer end of the section 53. The portions 58 and 59, as will be understood, may be made of adequate length of threaded engagement so as to enable frequent attachment and detachment without danger of wearing out the threads.

I claim:

1. A micrometer comprising, a pair of threaded telescopically engaged members, a sleeve fixed to the end of the inner of said members and surrounding the outer of said members, means providing an interiorly extending bearing at the opposite end of said outer member and having a portion thereof telescoping into the adjacent end of said inner member, and a measuring rod slidably carried in said bearing.

2. A micrometer comprising, a pair of threaded telescopically engaged members, a sleeve fixed to the end of the inner of said members adjacent one end thereof and surrounding the outer of said members, a measuring contact pin carried by said member end, means extending inwardly from the opposite end of said outer member and providing an interior bearing and having a portion thereof adapted to telescope into the adjacent end of said inner member to form an exterior bearing surface for support of said inner threaded member, a measuring rod slidably carried in said interior bearing and provided with a shoulder for abutting the last named end of said outer member, and means for securing said rod against movement in said bearing.

3. A micrometer comprising, inner and outer tubular members having a threaded engagement affording longitudinal adjustment of the members, a sleeve fixed to one end of said inner member and surrounding one end of said outer member, a measuring contact pin carried by said first end, a bushing carried by said outer member and extending interiorly of the opposite end of said outer member into the adjacent end of said inner member to provide adequate bearing means for a measuring rod slidably carried in said bushing, and means clamping said rod in position.

4. A micrometer comprising, inner and outer tubular members having a threaded telescopic engagement affording longitudinal adjustment of the members, a sleeve extending from one end of said inner member and surrounding said outer member, a bushing pressed into the opposite end of said outer member and extending interiorly thereof and into the adjacent end of said inner member for journaled support of the latter, and a measuring rod slidably carried in said bushing along the entire inner length thereof and extending exteriorly the outer end thereof.

ERNEST MULLER.